(12) United States Patent
Tanaka et al.

(10) Patent No.: US 9,372,510 B2
(45) Date of Patent: Jun. 21, 2016

(54) INFORMATION TERMINAL PROVIDED WITH STRUCTURE WHICH PREVENTS ERRONEOUS OPERATION OF ELECTROSTATIC INPUTTING DEVICE

(71) Applicant: Panasonic Corporation, Kadoma-shi, Osaka (JP)

(72) Inventors: Shintaro Tanaka, Osaka (JP); Haruka Kaneko, Osaka (JP); Tetsuya Kawamoto, Osaka (JP); Yoshinari Matsuyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 38 days.

(21) Appl. No.: 14/198,006

(22) Filed: Mar. 5, 2014

(65) Prior Publication Data
US 2015/0055282 A1 Feb. 26, 2015

(30) Foreign Application Priority Data

Aug. 23, 2013 (JP) ................................ 2013-173791
Feb. 17, 2014 (JP) ................................ 2014-027451

(51) Int. Cl.
*H05K 5/00* (2006.01)
*G06F 1/16* (2006.01)
(52) U.S. Cl.
CPC .............. *G06F 1/1656* (2013.01); *G06F 1/169* (2013.01)

(58) Field of Classification Search
CPC .......... G02F 1/133308; G02F 2202/22; H05K 9/0067
See application file for complete search history.

(56) References Cited

U.S. PATENT DOCUMENTS

| 8,390,994 | B2 | 3/2013 | Ikezawa | |
|---|---|---|---|---|
| 2010/0085326 | A1 | 4/2010 | Anno | |
| 2012/0092285 | A1* | 4/2012 | Osborn et al. | ................ 345/174 |
| 2013/0016047 | A1 | 1/2013 | Masumoto | |

FOREIGN PATENT DOCUMENTS

| JP | 2009-26503 A | 2/2009 |
|---|---|---|
| JP | 2010-86498 A | 4/2010 |
| JP | 2011-165405 | 8/2011 |
| JP | 2013-041566 A | 2/2013 |
| JP | 2013-148941 A | 8/2013 |

OTHER PUBLICATIONS

Office Action issued in corresponding Japanese Patent Application No. 2014-027451, Nov. 10, 2015 (3 pages).

* cited by examiner

*Primary Examiner* — Robert J Hoffberg
*Assistant Examiner* — Hung Dang
(74) *Attorney, Agent, or Firm* — Hamre, Schumann, Mueller & Larson, P.C.

(57) ABSTRACT

The present disclosure provides an information terminal which comprises: a casing having a main surface; a touch pad arranged on the main surface; an insulation sheet member arranged on a rear surface of the touch pad; and a conductive sheet member arranged on a rear surface of the insulation sheet member. The conductive sheet member may have a portion which extends toward the outside from an edge portion of the insulation sheet member.

7 Claims, 6 Drawing Sheets

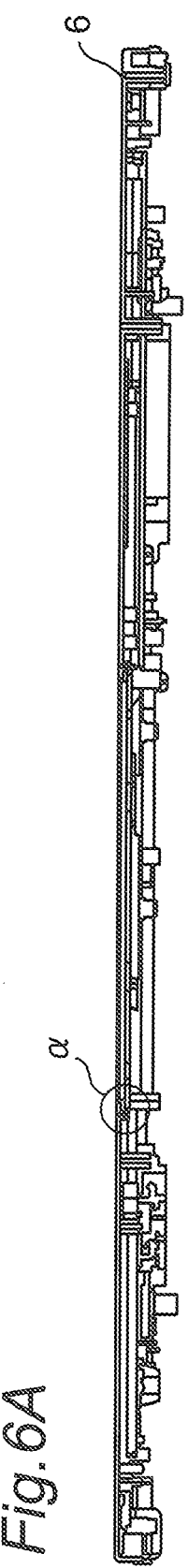
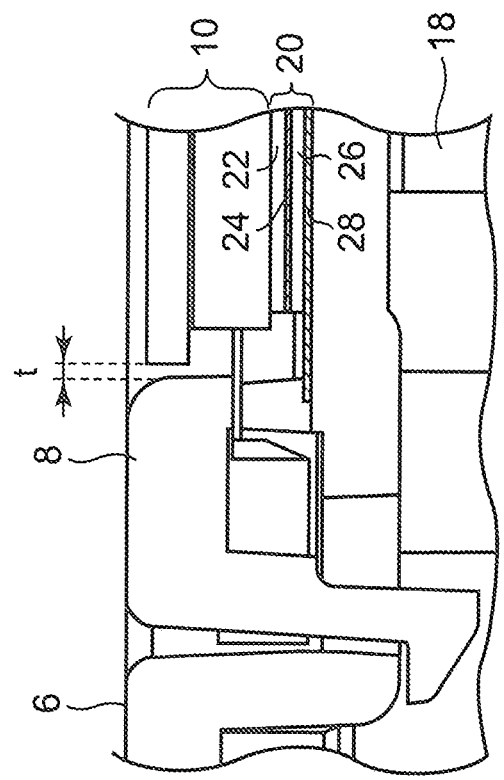
Fig. 6A
Fig. 6B

INFORMATION TERMINAL PROVIDED WITH STRUCTURE WHICH PREVENTS ERRONEOUS OPERATION OF ELECTROSTATIC INPUTTING DEVICE

BACKGROUND

1. Technical Field

The present disclosure relates to an information terminal provided with the structure which prevents an erroneous operation of an electrostatic inputting device.

2. Related Art

JP 2011-165405 A discloses the invention on an electronic apparatus where a gap is formed between a display unit and a non-conductive exterior member and static electricity which intrudes the electronic apparatus into through the gap is led to an earth portion of a printed circuit board. In such an electronic apparatus, a discharge member through which static electricity flows is arranged outside the exterior member.

SUMMARY

According to the present disclosure, there is provided an information terminal which hardly generates a failure in a printed circuit board portion of an electrostatic inputting device even when an electrostatic discharge (ESD) occurs.

The present disclosure provides an information terminal which comprises a casing having a main surface, a touch pad arranged on the main surface, an insulation sheet member arranged on a rear surface of the touch pad, and a conductive sheet member arranged on a rear surface of the insulation sheet member.

The information terminal of this disclosure hardly generates a failure in a printed circuit board portion of an electrostatic inputting device even when an electrostatic discharge (ESD) occurs.

BRIEF DESCRIPTION OF DRAWINGS

FIG. 6A is a longitudinal cross-sectional view of the body of the information terminal according to the first embodiment; and FIG. 6B is a partially enlarged view of the longitudinal cross section shown in FIG. 6A.

DETAILED DESCRIPTION OF PREFERRED EMBODIMENTS

Figure 1:
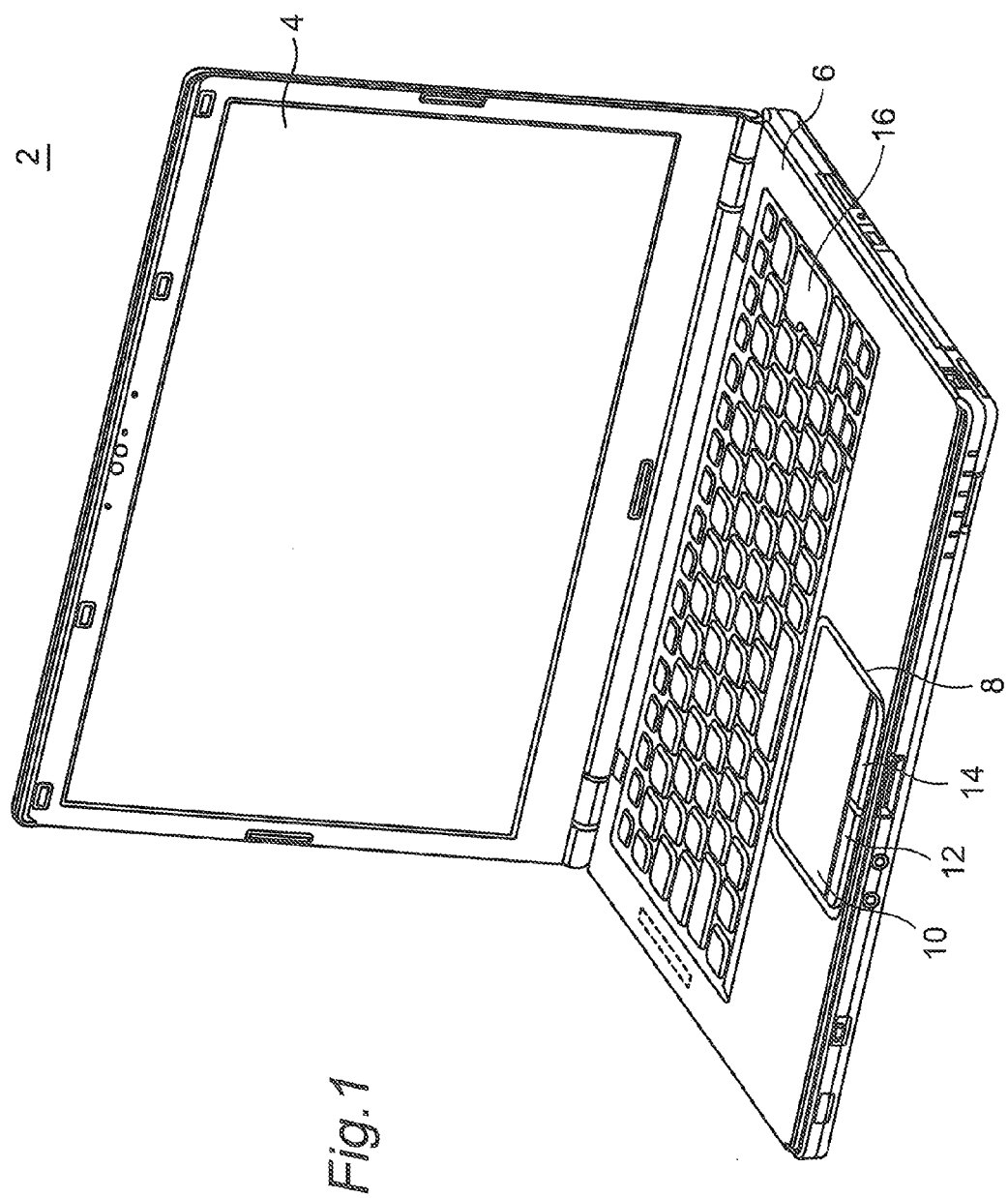
FIG. 1 is an entire perspective view of an information terminal according to a first embodiment.

Hereinafter, an embodiment will be described in detail by reference to drawings appropriately. However, the excessively detailed explanation may be omitted when appropriate. For example, the detailed explanation of well-known matters or the repeated explanation of the substantially same constitution may be omitted. These are taken for preventing the explanation made hereinafter from being unnecessarily redundant thus facilitating the understanding of the present disclosure by those who are skilled in the art.

Inventors of this disclosure provide the attached drawings and the explanation made hereinafter for enabling those who are skilled in the art to sufficiently understand the present disclosure, and the subjects defined in the claims are not intended to be restricted by the attached drawings and the explanation made hereinafter.

(Circumstances of Embodiments)

In a conventional information terminal (for example, notebook-type personal computer), an edge portion of a touch pad (electrostatic inputting device) is covered with a pad bezel. That is, a portion of the pad bezel overlaps with the edge portion of the touch pad. Accordingly, in the conventional information terminal, in the vicinity of the touch pad, there is no gap which directly penetrates a body casing of the information terminal toward the inside of the body casing from above the body casing. Since the gap which directly penetrates the body casing is not present in this manner, there is no possibility that static electricity discharged from an operator operating the conventional information terminal intrudes into a printed circuit board portion inside the touch pad.

To further accelerate portability of an information terminal, nowadays, attempts have been made to realize the further reduction of a thickness of the information terminal. With respect to such an information terminal where the reduction of the thickness is underway, an attempt has been made where a touch pad and a pad bezel are arranged parallel to each other such that an upper surface of the touch pad and an upper surface of the pad bezel become approximately coplanar with each other.

When the touch pad and the pad bezel are arranged parallel to each other in the information terminal, a gap which directly penetrates a body casing of the information terminal toward the inside of the body casing from above is formed between the touch pad and the pad bezel. In this case, static electricity discharged from an operator intrudes into a printed circuit board portion inside the touch pad through the gap and hence, there exists a possibility of the generation of a phenomenon that a failure occurs in the printed circuit board portion into which static electricity intrudes.

To prevent such a phenomenon that static electricity discharged from an operator intrudes into the printed circuit board portion of the touch pad through the gap formed between the touch pad and the pad bezel, it may be possible to take a countermeasure where conductive plating is applied to a surface of the pad bezel and a surface of the body casing. However, applying of conductive plating to the surface of the pad bezel and the surface of the body casing considerably pushes up a cost.

In view of such circumstances, inventors of this disclosure have developed the structure which makes it difficult for static electricity discharged from an operator to intrude into a printed circuit board portion of a touch pad even in an information terminal where a touch pad and a pad bezel are arranged parallel to each other for realizing the reduction of thickness, and a gap which directly penetrates a body casing toward the inside of the body casing from above the body casing is formed between the touch pad and the pad bezel.

(First Embodiment)

Hereinafter, the first embodiment is explained by reference to FIG. 1 to FIG. 6B.

[1-1. Constitution of Information Terminal]

FIG. 1 is a perspective view of an information terminal according to the first embodiment. The information terminal 2 according to the first embodiment includes, in the same manner as a usual notebook-type personal computer, a body, a display part 4 and an inputting part. The body is housed in the inside of a (body) casing 6.

As shown in FIG. 1, the inputting part includes a keyboard 16, a touch pad 10, a left button 12, and a right button 14. An electronic printed circuit board is arranged in the inside of the touch pad 10, and a circuit pattern is formed in the electronic printed circuit board. A ground (GND) terminal is arranged on an outer periphery of the electronic printed circuit board. A pad bezel 8 is arranged around the touch pad 10. As explained in detail later, the touch pad 10, the pad bezel 8 and the body casing 6 are arranged relative to each other such that an upper surface of the touch pad 10, an upper surface of the pad bezel 8 and an upper surface of the body casing 6 become approximately coplanar with each other.

In this specification, with respect to the body casing 6 shown in FIG. 1, a surface on which the keyboard 16 and the touch pad 10 are mounted is referred to as "upper surface", "main surface" or "front surface". Accordingly, a surface of the body casing 6 on a side opposite to "upper surface", "main surface" or "front surface" not shown in FIG. 1 is referred to as "lower surface", "sub surface" or "rear surface". In combination with these definitions, in this specification, with respect to the body casing 6, the direction along which "upper surface" or "front surface" is present is referred to as "upper" or "front", and the direction along which "lower surface" or "rear surface" is present is referred to as "lower" or "rear".

Figure 2A:
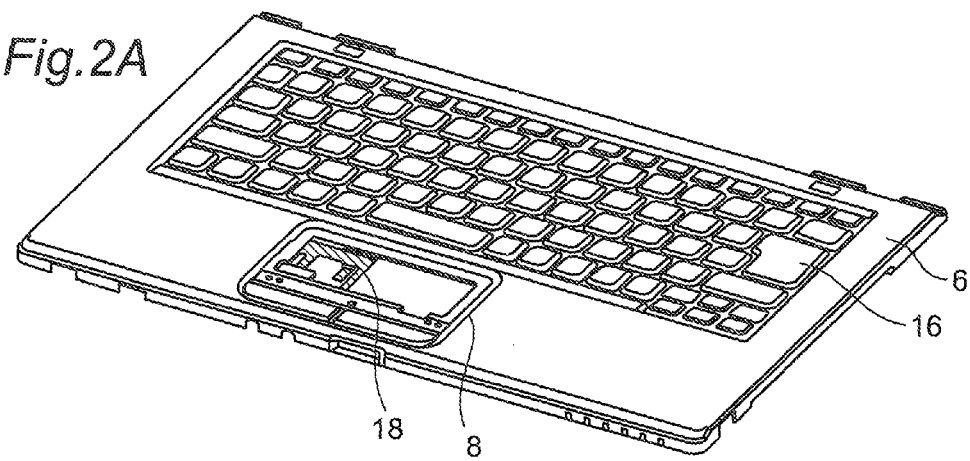
FIG. 2A is the perspective view of the body of the information terminal according to the first embodiment in a state where a touch pad is removed.
Figure 2B:
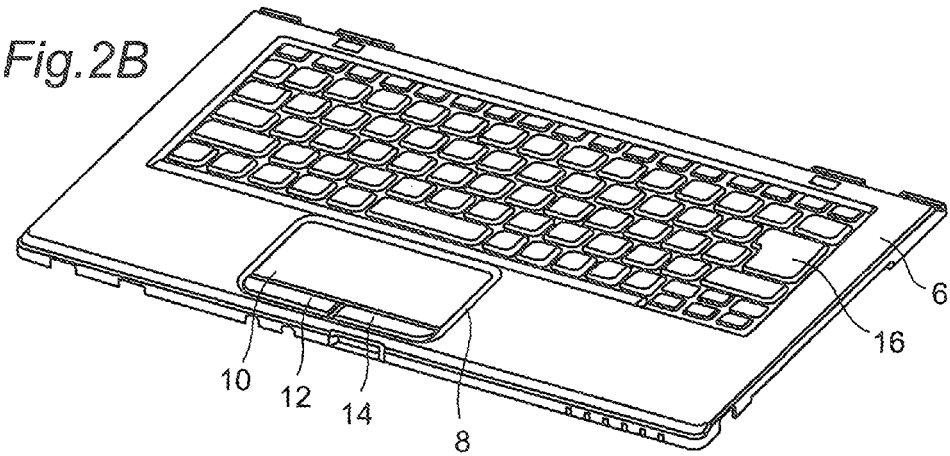
FIG. 2B is a perspective view of a body of the information terminal according to the first embodiment in a state where the touch pad is mounted.

FIG. 2A and FIG. 2B are perspective views of the body of the information terminal 2 according to the first embodiment. FIG. 2B is the perspective view of the body of the information terminal 2 in the state where the touch pad 10 is mounted on the body of the information terminal 2, while FIG. 2A is the perspective view of the body of the information terminal 2 in a state where the touch pad 10 is removed. With respect to the body of the information terminal 2 shown in FIG. 2A, a lower sheet layer 20 explained later is also removed.

As shown in FIG. 2A, a printed circuit board 18 on which electronic parts are mounted is arranged on a lower portion side of the touch pad 10 (that is, an inner side of the body casing 6).

[1-2. Constitution of Lower Sheet Layer]

Figure 3A:
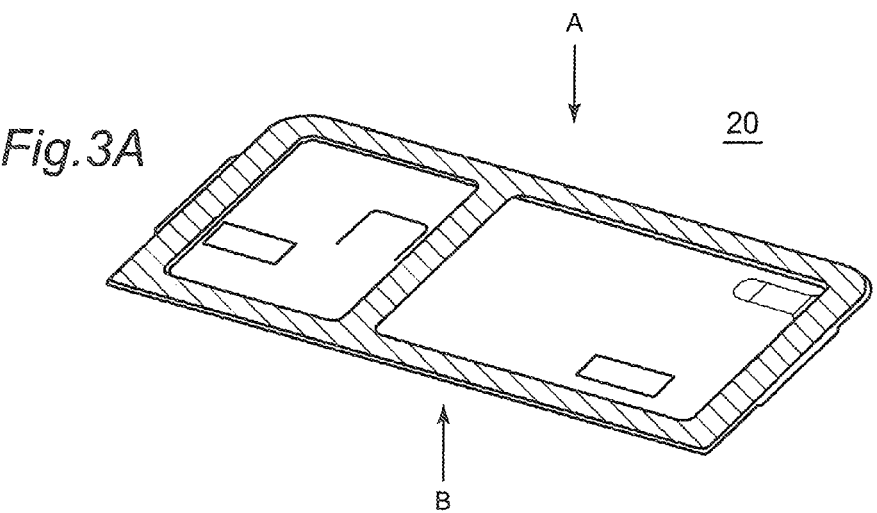
FIG. 3A is a perspective view of a lower sheet of the touch pad of the information terminal according to the first embodiment.
Figure 3B:
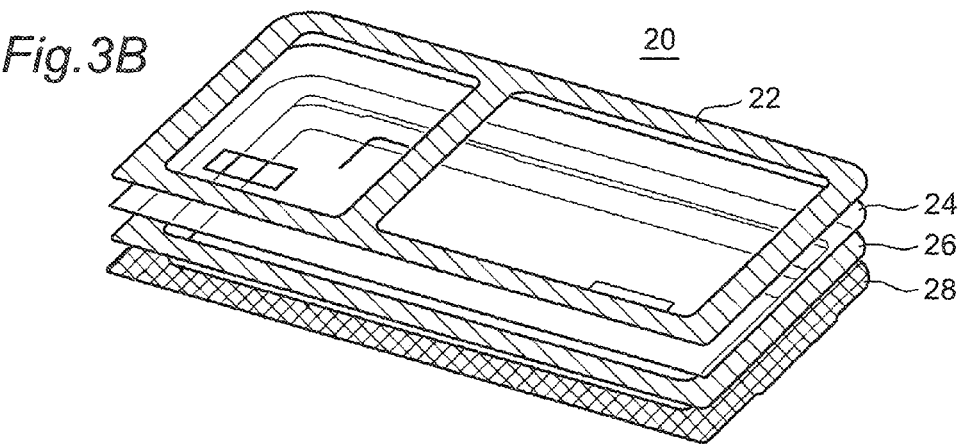
FIG. 3B is an exploded perspective view showing the layer structure of the lower sheet layer of the touch pad of the information terminal according to the first embodiment.

In the information terminal 2 according to the first embodiment, the lower sheet layer 20 is arranged on a rear side (inner side) of the touch pad 10 between the touch pad 10 and the printed circuit board 18 on which the electronic parts arranged in the inside of body casing 6 are mounted (see FIG. 6B). FIG. 3A is a perspective view of the lower sheet layer 20 arranged on a rear surface of the touch pad 10 in the information terminal 2 according to the first embodiment. FIG. 3B is an exploded perspective view showing the layer constitution of the lower sheet layer 20.

The lower sheet layer 20 is formed by adhering four sheet members, that is, a first double-sided adhesive sheet 22, an insulation sheet 24, a second double-sided adhesive sheet 26 and a conductive cloth 28 such that these four sheet members form the layer structure.

The first double-sided adhesive sheet 22 is formed of a double-sided adhesive tape, and the first double-sided adhesive sheet 22 is adhered to a rear surface of the touch pad 10 and a front surface of the insulation sheet 24. The first double-sided adhesive sheet 22 has a thickness of 0.1 to 0.2 mm, for example.

The insulation sheet 24 is a sheet member made of an insulation material. As shown in FIG. 3A and FIG. 3B, opening portions (holes) may be formed in the insulation sheet 24. The insulation sheet 24 has a thickness of 0.01 to 0.1 mm, for example.

The second double-sided adhesive sheet 26 is formed of a double-sided adhesive tape, and the second double-sided adhesive sheet 26 is adhered to a rear surface of the insulation sheet 24 and a front surface of the conductive cloth 28. The second double-sided adhesive sheet 26 has a thickness of 0.1 to 0.2 mm, for example.

The conductive cloth 28 is a sheet member made of a conductive material. As shown in FIG. 3B (and FIG. 4B), the conductive cloth 28 may be formed of only a portion corresponding to an edge portion of the insulation sheet 24 and portions which slightly extend toward the outside wider from edge end portions of the edge portions by approximately 0.01 mm to 1.0 mm, for example. By forming the conductive cloth 28 mainly by the portion corresponding to the edge portion of the insulation sheet 24, a weight of the whole information terminal 2 including the conductive cloth 28 can be reduced. The conductive cloth 28 is electrically connected to a portion which is formed on a rear surface of the body casing 6 by metal vapor deposition and to which electricity is supplied and other casings to which electricity can be supplied.

In conformity with a shape of the conductive cloth 28, the second double-sided adhesive sheet 26 may be, as shown in FIG. 3B, formed of only a portion corresponding to the conductive cloth 28 or a portion smaller than the conductive cloth 28. Further, the first double-sided adhesive sheet 22 may be, as shown in FIG. 3B, formed of only a portion corresponding to the second double-sided adhesive sheet 26 and a portion corresponding to a portion of the insulation sheet 24.

Figure 4A:
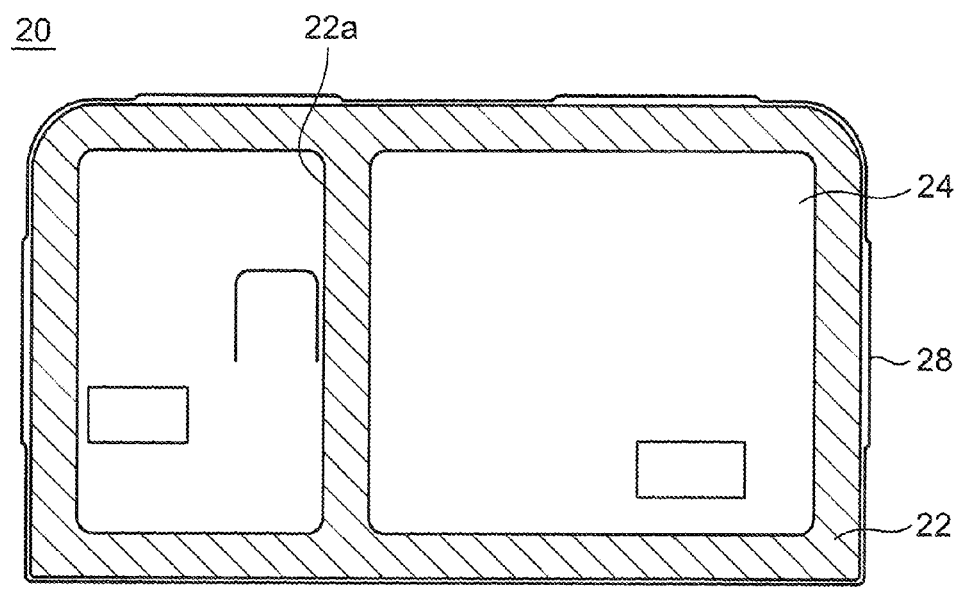
FIG. 4A is a plan view of the lower sheet layer of the touch pad of the information terminal according to the first embodiment.
Figure 4B:
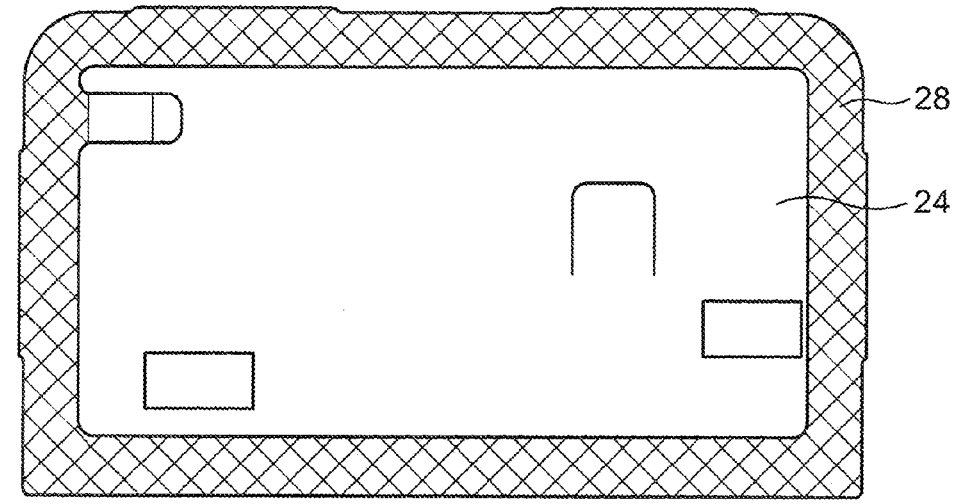
FIG. 4B is a bottom view of the lower sheet layer of the touch pad of the information terminal according to the first embodiment.

FIG. 4A is a plan view of the lower sheet layer 20 formed as described above as viewed from a point A in FIG. 3A. FIG. 4B is a bottom view of the lower sheet layer 20 as viewed from a point B in FIG. 3A.

[1-3. Constitution of Touch Pad, Lower Sheet Layer and Pad Bezel]

Next, the explanation is made with respect to the constitutional arrangement among the touch pad 10, the lower sheet layer 20 and the pad bezel 8 in the information terminal 2 according to the first embodiment.

Figure 5:
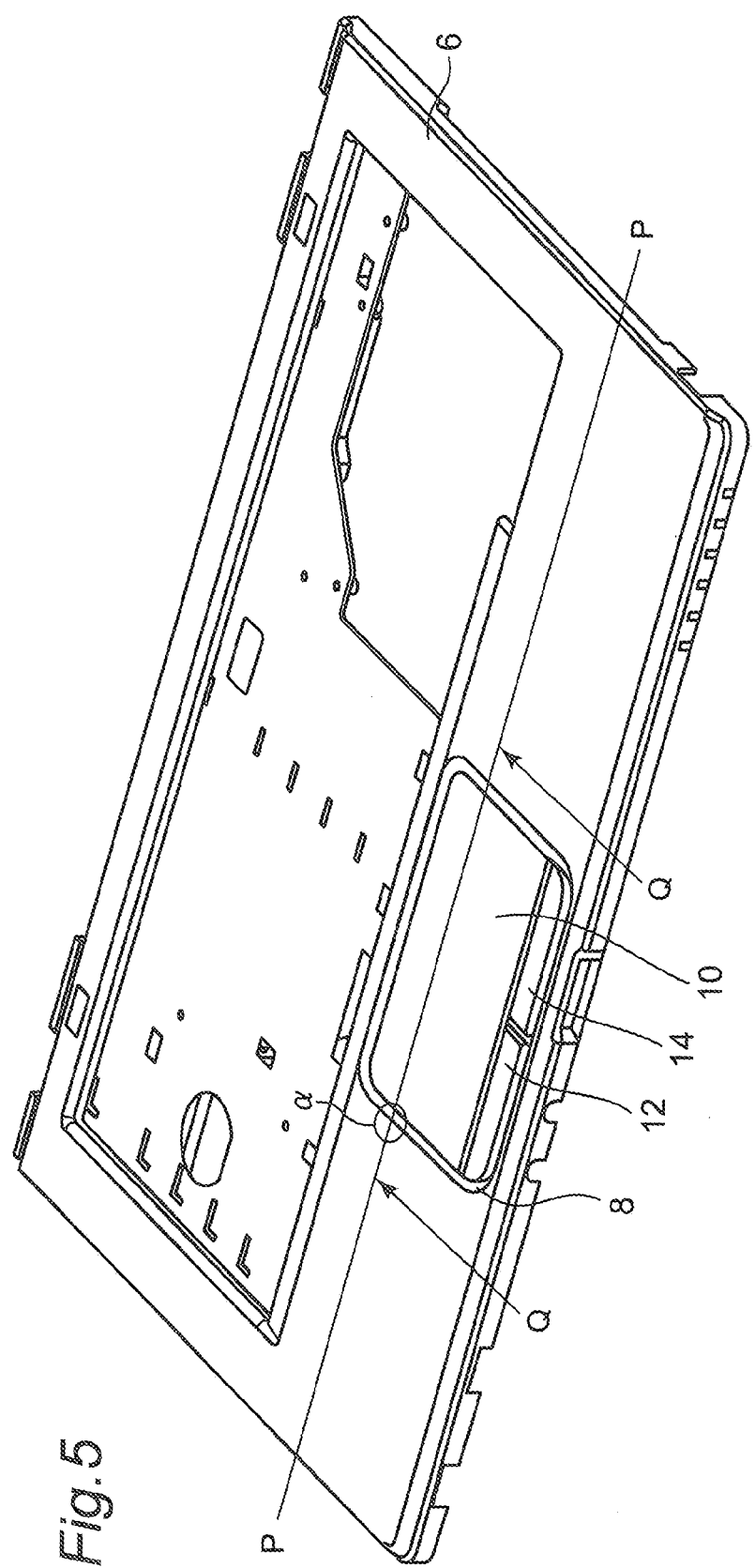
FIG. 5 is a perspective view of the body of the information terminal according to the first embodiment in a state where the keys of the keyboard are removed.

FIG. 5 is a perspective view of the body of the information terminal 2 according to the first embodiment in a state where the keys of the keyboard are removed. Assume a longitudinal cross section which passes a line PP in the body shown in FIG. 5. FIG. 6A is a longitudinal cross-sectional view taken along a longitudinal cross section which passes a line PP as viewed in the direction of Q shown in FIG. 5. FIG. 6B is an enlarged view of a portion surrounded by a circle α in the longitudinal cross-sectional view shown in FIG. 6A.

As shown in FIG. 2A, in the information terminal 2 according to the first embodiment, the pad bezel 8 is fitted in a recessed portion formed on the main surface of the body casing 6, and the touch pad 10 is arranged inside the pad bezel 8. The touch pad 10, the pad bezel 8 and the body casing 6 are arranged relative to each other such that an upper surface of the touch pad 10, an upper surface of the pad bezel 8, and an upper surface of the body casing 6 become approximately coplanar with each other (see FIG. 6B). Here, the lower sheet layer 20 (the first double-sided adhesive sheet 22, the insulation sheet 24, the second double-sided adhesive sheet 26 and the conductive cloth 28) arranged on a rear surface of the touch pad 10 is arranged on a more front surface side than the rear surface of the body casing 6 and the printed circuit board 18 on which electronic parts are mounted (see FIG. 6B).

The pad bezel 8 and the touch pad 10 are arranged parallel to each other and hence, as shown in FIG. 6B, a gap t is formed between the pad bezel 8 and the touch pad 10. There may be a case where static electricity discharged from an operator of the information terminal 2 intrudes into the inside of the body of the information terminal 2 through this gap t.

In the information terminal 2 according to the first embodiment, the conductive cloth 28 arranged on the rear surface of the insulation sheet 24 receives a discharge of static electricity through the gap t. The conductive cloth 28 is electrically connected with a portion which is formed on the rear surface of the body casing 6 by metal vapor deposition and to which electricity is supplied or other casings to which electricity can be supplied and hence, the conductive cloth 28 receives discharge whereby static electricity which passes through the gap t is leaked to the outside.

[1-4. Role of Conductive Cloth]

As explained previously, the electronic printed circuit board is arranged in the inside of the touch pad 10 and the circuit pattern is formed in the electronic printed circuit board, and the ground (GND) terminal is arranged on the outer periphery of the electronic printed circuit board. Here, assuming a conventional information terminal which is not provided with the conductive cloth 28, there is a high possibility that static electricity jumps toward the GND terminal through the gap t formed between the pad bezel 8 and the touch pad 10. It is expected that static electricity which jumps toward the GND terminal not only intrudes into the GND terminal but also intrudes into a portion of the electronic printed circuit board thus causing a failure.

The conductive cloth 28 in the information terminal 2 according to the first embodiment has an extremely large electric capacitance compared to the GND terminal arranged on the outer periphery of the electronic printed circuit board. Accordingly, in the information terminal 2 according to the first embodiment which is provided with the conductive cloth 28, static electricity through the gap t formed between the pad bezel 8 and the touch pad 10 is discharged to the conductive cloth 28 and, then, static electricity is leaked to the electricity supply portion on the rear surface of the body casing 6 connected to the conductive cloth 28 or other casings to which electricity can be supplied.

Alternatively, in the information terminal 2 according to the first embodiment, it is considered that an electric resistance when static electricity is discharged to the conductive cloth 28 through the gap t formed between the pad bezel 8 and the touch pad 10 is extremely small compared to an electric resistance which is generated when static electricity enters the electronic printed circuit board portion after passing the GND terminal of the touch pad 10. Accordingly, static electricity which flows through the gap t formed between the pad bezel 8 and touch pad 10 is not discharged to the GND terminal of the touch pad 10 but is discharged to the conductive cloth 28.

To further accelerate such discharging of static electricity to the conductive cloth 28 through the gap t formed between the pad bezel 8 and touch pad 10, as shown in FIG. 3A, FIG. 3B, FIG. 4A and FIG. 6B, it is preferable that the conductive cloth 28 is slightly wider toward the outside than the edge end portions of the insulation sheet 24 by approximately 1 mm, for example. Further, as shown in FIG. 6B, it is preferable that the conductive cloth 28 is slightly wider toward the outside than the edge end portion of the insulation sheet 24 such that a portion of the conductive cloth 28 is present directly below the gap t formed between the pad bezel 8 and the touch pad 10.

[1-5. Conclusion]

The information terminal 2 according to the first embodiment includes: the body casing 6 having the main surface; the touch pad 10 arranged on the main surface; the insulation sheet member 24 arranged on the rear surface of the touch pad 10; and the conductive sheet member 28 arranged on the rear surface of the insulation sheet member 24.

Although the gap is present between the touch pad 10 and the casing 6 or the pad bezel 8 in the information terminal 2 according to the first embodiment as described above, there is no possibility that a failure occurs in the electronic printed circuit board portion of the touch pad 10 due to an electrostatic discharge (ESD) to the gap from the outside.

(Another Embodiment)

As has been explained above, the first embodiment is explained so as to exemplify the techniques according to the present disclosure. However, the present disclosure is not limited to such techniques, and various changes, replacements, additions, omissions and the like can be made thereto.

In the information terminal 2 according to the first embodiment, the touch pad 10, the pad bezel 8 and the body casing 6 are arranged relative to each other such that the upper surface of the touch pad 10, the upper surface of the pad bezel 8 and the upper surface of the body casing 6 become approximately coplanar with each other (see FIG. 6B). However, the information terminal 2 is not limited such arrangement. For example, the information terminal 2 may not be provided with the pad bezel 8, and touch pad 10 and body casing 6 may be arranged relative to each other such that the upper surface of the touch pad 10 and the upper surface of the body casing 6 become coplanar with each other.

The embodiment has been explained heretofore as an example of the technique according to the present disclosure. For this purpose, the attached drawings and the detailed explanation are provided. Accordingly, the constitutional elements described in the attached drawings and the detailed description may also include not only the constitutional elements necessary for overcoming the problems but also constitutional elements which are unnecessary for overcoming the problems in order to exemplify the aforementioned techniques. Therefore, such unnecessary constitutional elements should not be immediately determined to be necessary, for the reason that these unnecessary constitutional elements are described in the attached drawings and the detailed description.

Further, the aforementioned embodiment is merely for exemplifying the techniques according to the present disclosure and, therefore, various changes, replacements, additions, omissions and the like can be made thereto within the scope of the claims and scopes equivalent thereto.

INDUSTRIAL APPLICABILITY

The present disclosure is applicable not only to a notebook-type personal computer but also to a laptop-type personal computer, a desktop-type computer or a tablet-type computer.

What is claimed is:
1. An information terminal comprising:
a casing having a main surface including an opening;

a touch pad arranged in the opening on the a main surface of the casing, wherein a gap is formed between an edge of the casing defining the opening and the touch pad;

an insulation sheet member arranged on a rear surface of the touch pad; and a conductive sheet member that absorbs static electricity penetrating through the gap to avoid a failure of the touch pad, arranged on a rear surface of the insulation sheet member.

2. The information terminal according to claim 1, wherein the conductive sheet member has a portion which extends toward the outside from an edge portion of the insulation sheet member.

3. The information terminal according to claim 2, wherein the portion of the conductive sheet member which extends toward the outside from the edge portion of the insulation sheet member is wider than an edge portion of the insulation sheet member by 0.01 to 1.0 mm.

4. The information terminal according to claim 1, wherein the casing further comprises a pad bezel with a predetermined gap formed between the pad bezel and the touch pad.

5. The information terminal according to claim 1, wherein the conductive sheet member is formed of a portion corresponding to an edge portion of the insulation sheet member.

6. The information terminal according to claim 1, further comprising a printed circuit board which is arranged in the inside of the casing and on which an electronic part is mounted, wherein the conductive sheet member is arranged on a more main surface side than the printed circuit board.

7. The information terminal according to claim 2, wherein the conductive sheet member extends across the gap.

* * * * *